Feb. 28, 1967  R. WHITMAN  3,306,018
HARVESTER FOR POD TYPE CROPS
Filed Aug. 31, 1964  4 Sheets-Sheet 1

INVENTOR.
RAY WHITMAN
BY Owen, Wickersham & Erickson
ATTORNEYS

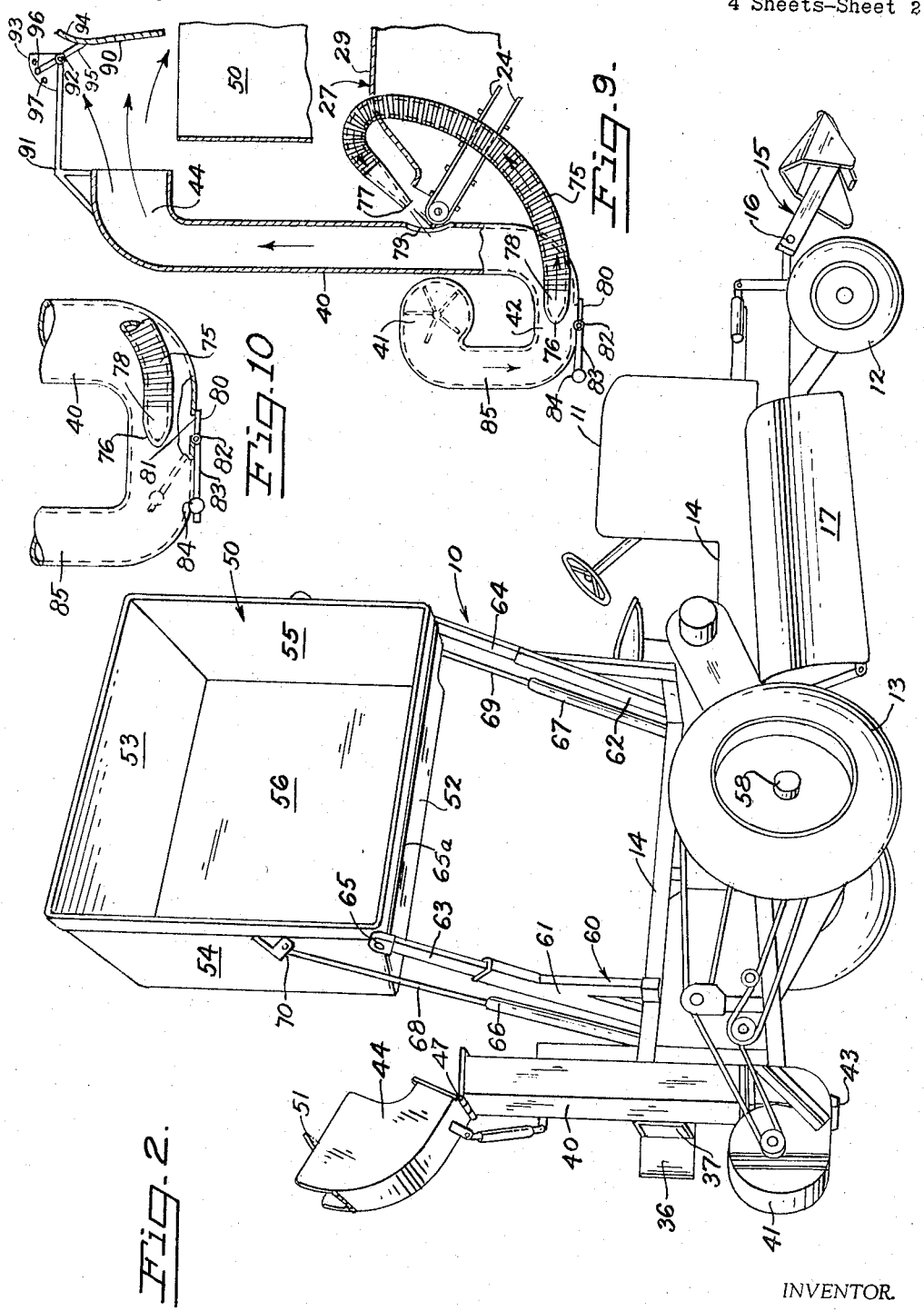

Feb. 28, 1967   R. WHITMAN   3,306,018
HARVESTER FOR POD TYPE CROPS
Filed Aug. 31, 1964   4 Sheets-Sheet 3
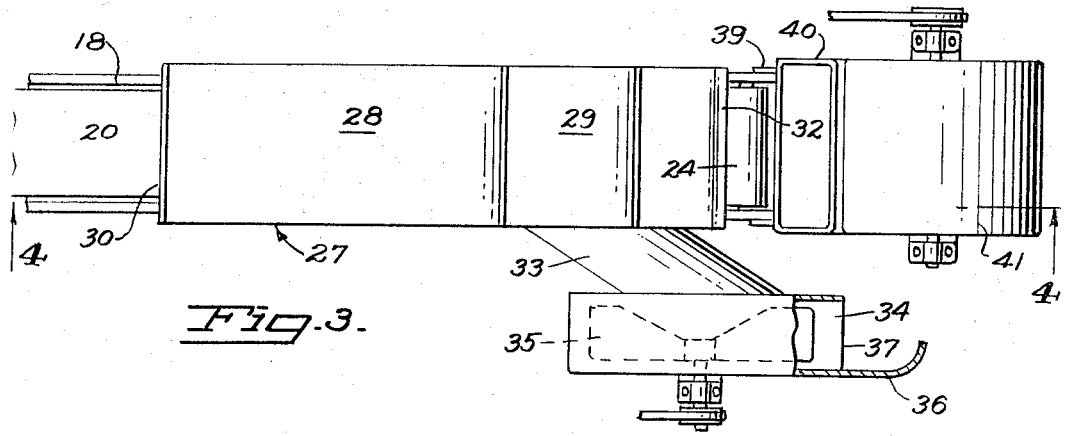
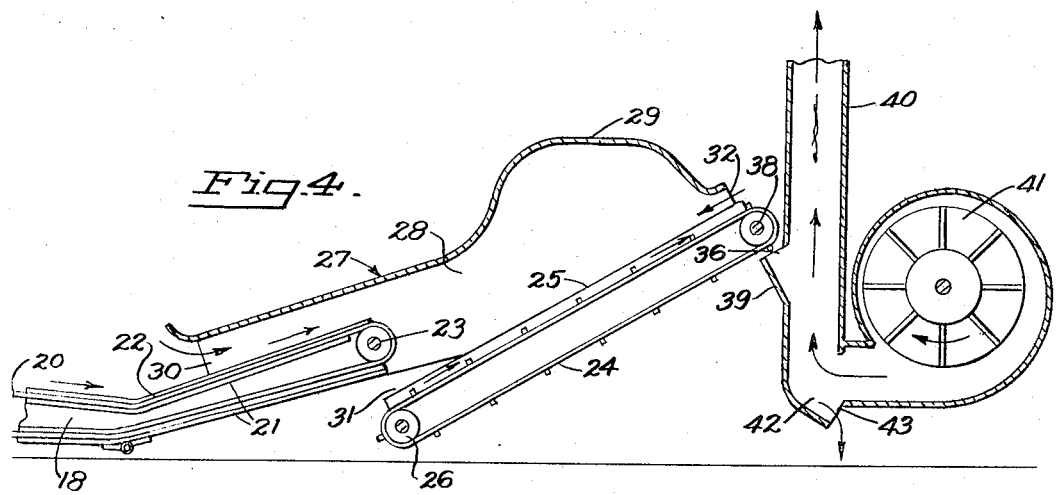
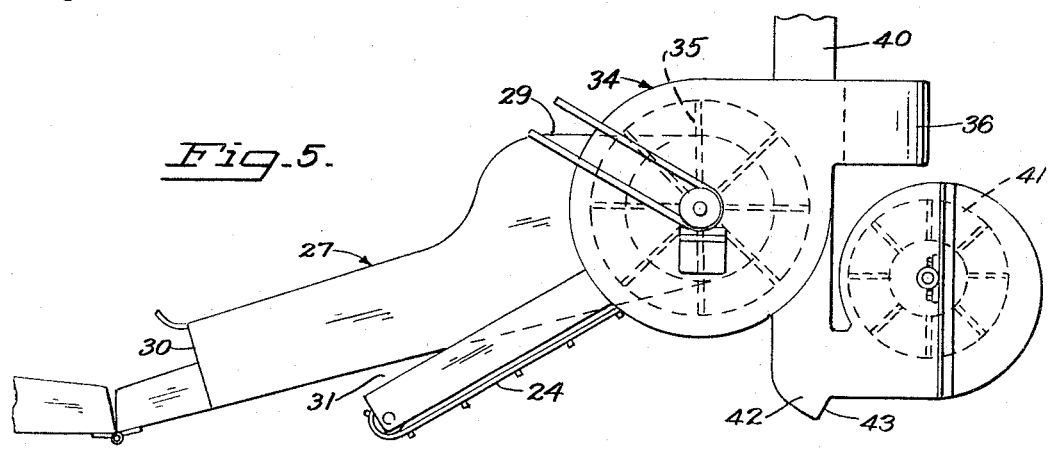
INVENTOR.
RAY WHITMAN
BY Owen, Wickersham & Erickson
ATTORNEYS

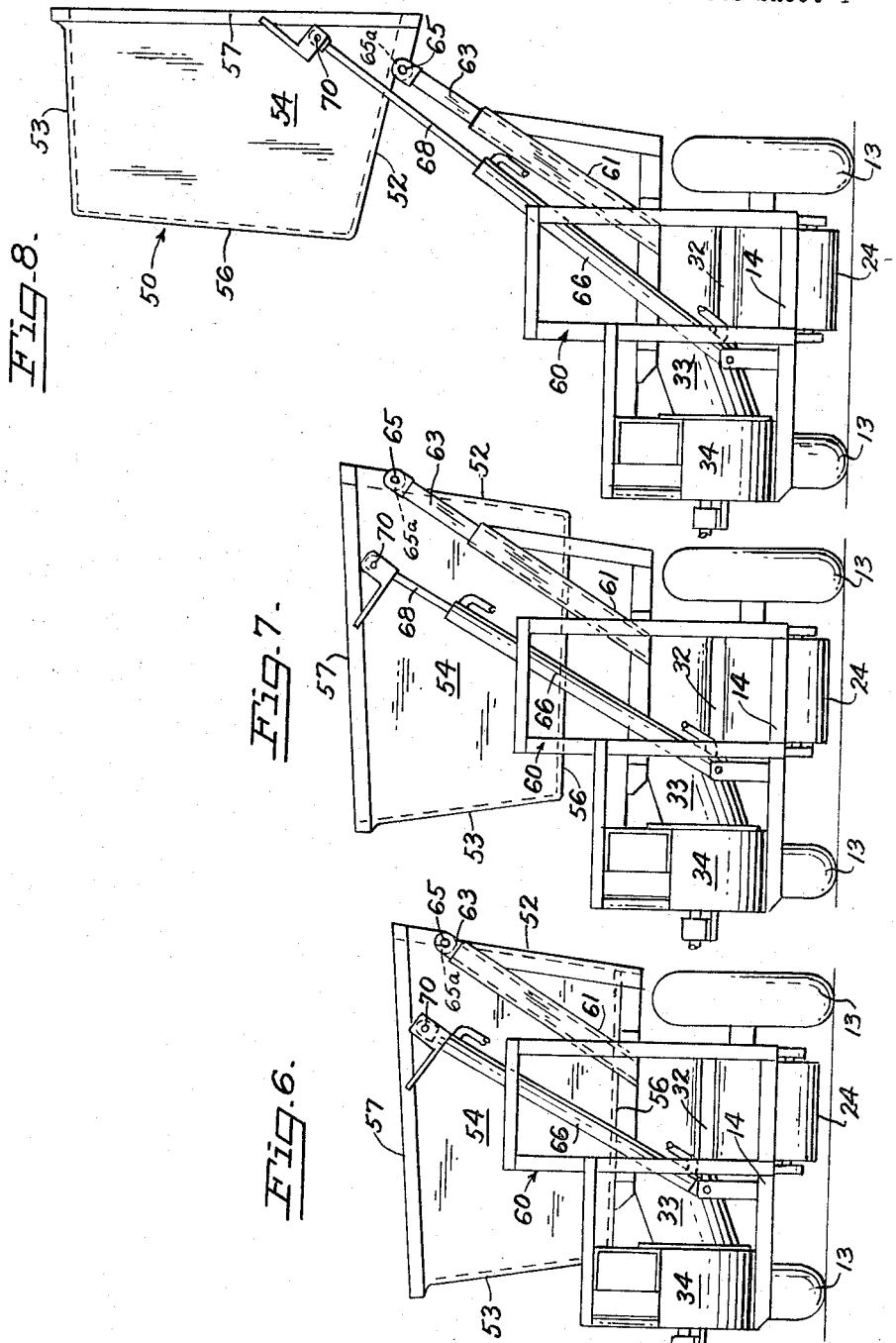

3,306,018
HARVESTER FOR POD TYPE CROPS
Ray Whitman, Patterson, Calif., assignor to
Virginia Gray, Cunningham, Kans.
Filed Aug. 31, 1964, Ser. No. 393,277
18 Claims. (Cl. 56—126)

This invention relates to improvements in crop harvesters with particular reference to harvesters for pod type crops such as beans, peas, black-eyed peas, peppers, etc., the harvesting of snap beans being used as a particular example.

Bean harvesters heretofore have been long, ungainly machines and have been inefficient in separating the beans from the light trash (including leaves and stem parts broken off by the picking mechanism) and from rocks and dirt picked up by the harvesting machine. The very length of these harvesters has prevented them from being easily moved from one place to another, each harvester heretofore requiring a complete long truck trailer. Moreover, these harvesters, when in the field, have been unable to harvest in the corners of the fields, in many instances missing a large proportion of the crop through the inability of the machine to turn sharply because of its undue length.

Even with this great length, prior-art harvesters have heretofore had to be followed in the field by a separate truck having a bin into which the harvested crop was continuously deposited by conveyors on the rear end of the harvester. This procedure has been inefficient and has extended the effective length of the harvester even further, for the bin and its truck had to follow closely behind the harvester and be in line with it.

Among the objects of the present invention are to provide a short, compact, bean harvester, two of which can be transported end-to-end on one truck trailer, and to provide a harvester that can maneuver readily in the field and can harvest substantially all of the farmer's crop, because of its short length and efficient action.

Another object of the invention is to provide better cleaning of beans from light trash, so that the final harvested crop is of higher quality and requires fewer operations in the cannery.

Another object of the invention is to provide for superior separation of the beans from heavy dirt and rocks, again improving the quality of the finished product.

Another object is to provide a bean harvester having its own bin for receiving the harvested and cleaned beans.

Another object is to provide an air transfer from the bean cleaner to the bin.

Another object is to provide a bin capable of rapid and efficient transfer of its contents to a vehicle pulled alongside the harvester.

In achieving these objects, various mechanical and other problems were encountered, which gave rise to special difficulties and which have been solved in arriving at the present invention.

In brief, the pod harvester of this invention relates particularly to the treatment of the crop after the actual pods have been picked. To the rear of the picking mechanism I provide an upwardly tilted conveyor from the rear end of which the beans, light trash, dirt, and rocks drop off onto a lower rearwardly and upwardly inclined conveyor. A strong vacuum or suction force is exerted over the falling beans and the beans progress up the second conveyor, raising the lighter trash and pulling it out. As the beans travel over the end of the first conveyor and onto the second conveyor, the suction causes a tumbling action helping the lifting out of the lighter trash. At the same time, this tumbling action causes the large dirt clods to roll off the lower end of the second conveyor.

After this cleaning action, the beans travel up the slanting second conveyor and fall into a vertical air leg, at the lower end of which is introduced a strong air current; there is also an outlet at the lower end of the air leg for other rocks and heavy matter which fall down. The beans are then raised in the air leg solely by air. They are dumped from the air leg forwardly into a bin which is mounted approximately centrally with respect to the rear wheels of the harvester, so that there is about as much of the bin in front of the axis of the rear wheels as there is behind it. The bin is of special construction for efficient dumping, the top of the air leg having an outlet which is tilted back at the time that the bin is dumped. The bin dumps out the side of the truck, again saving in length, the load truck receiving the material directly from the bin after pulling beside the harvester.

Other features, objects, and advantages of the invention will appear from the following description of a preferred form of the device.

In the drawings:

FIG. 1 is a view in side elevation of a bean harvester embodying the principles of this invention. At the forward end, broken lines indicate a transporting position for the fender assembly. At the rear end, broken lines indicate a tilted-back position of the air-leg outlet, employed when the bin is being dumped.

FIG. 2 is a view in perspective of the harvester in its bin-dumping position.

FIG. 3 is a fragmentary plan view of the air cleaning portion of the harvester, with a portion of the fan broken off and shown in section.

FIG. 4 is a view in elevation and in section taken along the line 4—4 in FIG. 3.

FIG. 5 is a view like FIG. 4 but showing the parts in side elevation.

FIG. 6 is a view in rear elevation with the air leg removed to show the bin more clearly in its normal position.

FIG. 7 is a view similar to FIG. 6 with the bin elevated and moved to the side before pivoting.

FIG. 8 is a view similar to FIG. 7 showing the bin in dumping position.

FIG. 9 is a fragmentary view in elevation and partly in section of a modified form of the device involving mainly the air leg and showing pertinent adjacent parts, but omitting the frame and some other portions.

FIG. 10 is a fragmentary enlarged view in elevation and in section of a small portion of FIG. 9.

Figure 1:
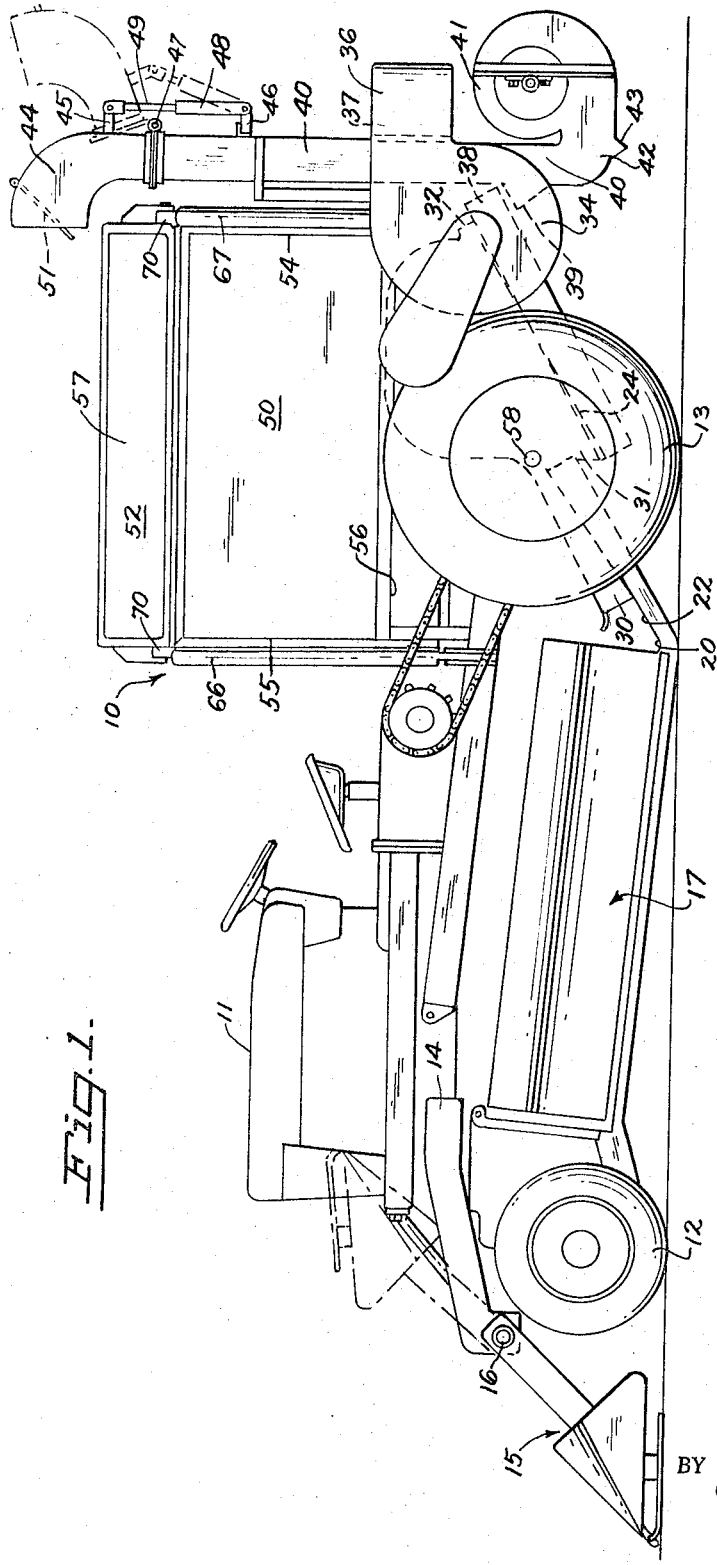

In order to give a specific example of how the invention may be practiced, I show a harvester 10 comprising a tractor 11 with front wheels 12, rear wheels 13, and a frame 14. In front of the front wheels 12 is provided a suitable guard assembly 15, which is covered in my copending application Serial No. 374,345, filed June 11, 1964. This guard device 15 can be swung about a pivot axis 16 to put it into the position shown in FIG. 1 in broken lines, so as to shorten the total length of the harvester 10. The guard assembly 15, in addition to preventing the bean plants from becoming entangled in the front and rear wheels 12 and 13 and in addition to protecting the bean plants from these wheels, urges the bean bushes and vines to a more erect position and guides them into a picking unit 17.

Various types of pickers 17 may be used, including those which are well-known, such as that shown in Ward Reissue Patent 25,044. For example, there may be a fore-and-aft frame 18 down the middle of the harvester 10 supporting a central rearwardly moving conveyor 20. One or more sets of reels (not shown because well-known) with picking fingers are rotated and act to snap the beans or other pod crop off the vine or bush and deposit the pods onto the conveyor 20. For different crops, different types of picking mechanisms may be used, or the picker 17 may be modified or altered.

The conveyor 20, which has its forward end at the forward end of the picking unit 17, continues beyond the picking unit 17 over a frame 21 that is pivotally attached to the frame 18 and is inclined upwardly therefrom. This frame 21 is provided with a unitary central flat bar support over which the conveyor belt 20 rides along an upwardly inclined path 22. At its rear end the conveyor belt 20 turns over an idler wheel or roller 23 and everything on the conveyor 20 is dumped out there.

During the picking operation, not only the desired pods but some leaves and pieces of stem and other trash have unavoidably been picked from the plant, although much of the plant remains intact and its roots remain in the soil. This light trash is objectionable, and the present invention provides a way of getting rid of it. Also, the picking fingers move close to the ground and often pick up rocks and clods of dirt. These clods of dirt and rocks also cause trouble and the invention gets rid of them too.

To aid in this cleaning operation, the pods are transferred from the main conveyor 20 to a second conveyor 24 having a frame 25 and extending rearwardly and upwardly. A belt-type conveyor 24 with small, short flights is preferably used so that the tips of the flights flick the bottoms of rocks and tend to impart to them a spin so that they rapidly roll and bounce down the conveyor 24 and roll off its lower end 26, due to their greater weight. Flat rocks are cared for later, but this operation usually gets rid of the rounded clods of dirt and of rounded rocks.

As shown by FIGS. 3–5, most of the conveyor portion 22 and most of the second conveyor 24 is covered by an air throat 27 comprising a lower housing 28 which extends on each side of and above the conveyors 22 and 24, and joins an upper housing 29. The lower housing 28 provides a narrow opening 30 for air at its forward end. Air is also admitted through the gap 31 between the conveyors 22 and 24 and also at the upper end of the upper housing 29 at the upper end of the second conveyor 24. These three air entries 30, 31, and 32 all lead via the space under the housing 29 to a single vacuum duct 33, and their meeting or convergence helps to provide turbulence for better cleaning. The duct 33 leads to a blower 34 having a fan 35 of the vane type that rotates, to develop suction which pulls the light trash material from the conveyor 24 and expels it but does not carry away the heavier pods. A baffle 36 is placed longitudinally of the tractor 11 and rearwardly from the fan outlet 37 so that the expelling takes place along the fore and aft line of the harvester 10 rather than out the side; therefore, the trash falls on a part of the crop which has already been harvested rather than covering an unharvested part of the crop.

The powerful fan 35 thus brings in three air currents from the inlets 30, 31, and 32, which impinge upon each other and generate a desirable amount of turbulence. The airstream flows from both ends of the second belt 24 toward the center of its length, and from there it flows into the duct 33; the turbulence along the belt 24 helps greatly in separating out the trash by causing the beans, leaves, rocks, and other material to tumble over and over, rather than letting them lie quietly on the belt 24 and remain stationary as the belt 24 moves up. This tumbling action helps both in eliminating the rocks at the lower end 26 and in drawing the trash away through the duct 33. At the same time, the air flowing in through the air throat inlet 30 is sweeping over the material on the conveyor 20 and picking up the light trash from it. All these airstreams thus pick up the light trash and carry it away, converging at the duct 33. From this stage on, the beans are substantially free of light trash, though a few flat rocks and a few clods of dirt may remain.

The upper end 38 of the second conveyor dumps the pods into a diagonal inlet conduit 39 somewhat above the lower end of a vertical air leg 40, which is a vertical, preferably rectangular, conduit positioned at the very rear end of the harvester 10. At the rearmost part of the machine 10 is a powerful blower 41, which sends a powerful airstream into the very bottom 42 of the air leg 40. At the entry point 42 into the duct, there is provided an outlet 43 for any remaining rocks and heavy trash, thereby getting rid of flat rocks and ony other matter heavier than the bean pods. The air current is so strong that few, if any, bean pods drop out this outlet 43 but all heavier material, such as rocks, does drop out there, the flow of air being adapted to the specific gravity of the beans, so that the air will carry the beans up the air leg 40 substantially cleaned both from the lightweight trash and the heavy dirt and rocks, all by gravity. The speed of the fan 41 can be varied to accommodate differences in density of the crop, to obtain the most advantageous air flow.

The upper end of the air leg 40 is provided with a retractable hinged outlet elbow 44 (See FIGS. 1 and 2). This outlet elbow faces toward the front of the harvester 10, and its wall is provided with a lug 45, while the rear wall of the main air leg 40 has a lug 46. A hinge 47 on the rear walls of both joins the air leg 40 to the elbow 44. Preferably, the joint is gasketed to eliminate air leakage at the hinge point. An hydraulic cylinder 48 is pivoted to the lug 46 and the rod 49 of its piston is pivoted to the lug 45. During normal operation the hydraulic pressure in the cylinder 48 positively holds the air leg outlet elbow 44 closed against the main vertical air leg portion 40. The elbow's outlet overlies a bin 50, and the hydraulic cylinder 48 is used to retract the elbow and prevent it from being struck by the bin 50 when that is being dumped.

At the top of the elbow 44, I provide an adjustable downwardly and forwardly inclined cover 51 which can be adjusted to the proper size opening.

The bin 50 (see especially FIGS. 2 and 6–8) comprises a generally rectangular structure having inclined side walls 52 and 53 which are nearly vertical with some upward and outward inclination, vertical front and rear walls 54 and 55, a flat bottom wall 56, and an open upper end 57. Preferably one side wall 52 is higher than the other side wall 53. During dumping the higher wall 52 is on the bottom and the lower wall 53 is at the top (FIG. 7).

It is desirable to lift the bin 50 for dumping and also to move it far enough to one side to be sure that the load will be dumped fully into a receiving vehicle. Also, it is desired to have the load leave outside the wheels. In order to achieve these results, the bin 50 is mounted substantially centrally above the axis 58 of the rear wheels 13, and a carriage frame 60 is mounted on the main frame 14. The carriage 60 has two sidewardly and upwardly inclined channel members 61, 62 in which are slidably mounted a corresponding pair of bar members 63, 64 whose upper ends are pivotally attached to the bin 50 by a pivot shaft 65 that rotates in a stationary pipe 65a welded to the bin 50; if desired, another type of pivotal attachment may be used. A pair of long cylinders 66 and 67 are pivotally secured, one at the forward end and one at the rear end, to the carriage frame 60. Their pistons have long connecting rods 68 and 69 which are pivotally attached to lugs 70 that are welded to the bin 50.

In the dumping operation, there are two stages. First, the hydraulic pressure in the cylinders 66 and 67 acts to move the bin 50 upwardly and outwardly (FIG. 6) while the members 63 and 64 slide in their channels 61 and 62, to get the pin 50 clear of the truck tractor 11 and to place it where it can dump into a vehicle brought alongside and not drop beans on the ground. Thus, this initial action simply raises the bin 50, still in its level position, to a higher and sideward position. At this point the carriage members 63 and 64 have reached their extremity in their channels 61 and 62 and from then on the bin 50 pivots about the shaft 65 upon further extension of the connecting rods 68 and 69. Thus, this further extension of the connecting rods 68 and 69 upends the bin 50 to about 90°, dumping the beans therefrom. Then the bin 50 is retracted in the same manner.

FIGS. 9 and 10 show several significant modifications relating to the air leg 40.

When picking beans in heavy foliage or at higher speeds, the beans and foliage tend to accumulate at the inlet conduit 39, where they fall off from the belt 25, and to cause plugging and interference with proper flow of the crop. This problem is effectively dealt with by the structure of FIG. 9. A flexible diversion conduit 75, which may be made from reinforced fabric, carries a portion of the air generated by the fan 41 from a take-off opening 76 to a wide spread, flattened and fanned-out nozzle 77 adjacent to an inlet opening 79, which replaces the inlet conduit 39. The take-off opening 76 may be oval, with its major axis vertical, so that an angle take-off fitting 78 provides a suitable fixture for the attachment of the conduit 75 and also provides a forward, nearly tangential flow so that the take-off is more effective. The conduit 75 smoothly carries this airstream up to a position opposite the inlet 79, where the nozzle 77 directs the airstream across the upper end of the belt 24 and into the inlet 79.

In a typical installation, the take-off opening 76 may be about three inches in diameter, the flexible conduit 75 about the same, and the nozzle 77 may be about a foot wide with an opening about an inch and a half high. The opening 79 is also about a foot wide and may be about six inches high. The nozzle 77 may be located about six inches above the belt 24 and about nine inches from the inlet 79 and points down into it, preferably at about 45°. The flattened, high velocity airstream blows the beans and foliage from the top of the belt 24 into the opening 79, whence the beans and foliage are picked up by the main vertical airstream, and carried upwardly. This keeps the opening 79 clear at all times.

The nozzle 77 is preferably welded to the harvester's frame so that the relationship between it and the inlet 79 remains constant. Its air jet is directed both toward the top of the belt 24 and the opening 79 and in line with them. It enables the harvester to travel at a good pace through heavy foliage without clogging.

In the modification shown in FIGS. 9 and 10 there is also a counterweighted gate 80 for closing an opening 81 corresponding to the opening 43. This saves air and conserves the power of the fan 41. Normally, the gate 80 keeps the opening 81 closed, for the gate 80 is pivoted on a pivot 82 and has a rod 83 extending on the opposite side of the pivot 82 with a counterweight 84 on the outboard end of the rod 83. The rod 83 with its counterweight 84 exert a greater moment than does the gate 80 and a substantial accumulation of rocks and dirt is required to force the gate 80 down, opening it and enabling the rocks and dirt to drop out through the opening 81. When they drop out, the counterweight automatically closes the gate 80. Thus, air is lost only when rocks and debris are actually being dumped. As indicated, in this device there is preferably a vertical conduit portion 85 leading down from the fan 41 to the elbow or bottom portion 42.

A third modification shown in FIG. 9 is an airstream dividing baffle 90 shown at the top of FIG. 9. This baffle 90 is mounted so that its angle of tilt can be adjusted. A frame 91 is secured rigidly to the top of the upper elbow 44 and is provided at its outboard end with a pivot rod 92 and a pair of perforated plates 93. The baffle 90 comprises a plate having a curved rear portion 94 and held to the frame 91 by a pair of identical side arms 95, one of which is seen in the side elevation view, FIG. 9. Each arm 95 is pivoted to the pivot rod 92 and has a portion extending beyond the pivot rod 92 and secured by a suitable nut 96 to any one of the perforations 97 in the plate 93. This means that the angle of tilt of the baffle 90 is easily adjusted to accommodate differences in harvesting conditions, including both crop and wind conditions.

The baffle 90 does two main things: it helps to give a further cleaning action by which foliage carried into the air leg 40 is removed, and it helps to spread out the beans in the bin 50.

As shown in FIG. 9, it divides the airstream into two streams, one striking the main portion of the baffle 90 and being deflected downwardly, and one going up against and above the curved upper baffle portion 94. The elbow 44 extends substantially horizontal; so the upper portion of the airstream that passes out from it is carrying almost entirely leaves and light weight trash, while the lower portion is laden with the heavier beans. Hence, the upper portion and its chaff are deflected up and float away from the bin 50, while the lower portion strikes the lower portion of the baffle 90 and is deflected downward while at the same time being spread out, so that the entire area of the bin is covered rather than the beans being piled conically over one spot.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A harvester for pod type crops, comprising
a self-propelled vehicle with front and rear wheels and a main frame,
pod picking means secured to said main frame in between and to the rear of said front wheels,
first mechanical conveyor means extending along the fore-and-aft center line of said vehicle and supported by said main frame adjacent said pod picking means for receiving picked pods, along with some leaves and stems and other light trash, said first mechanical conveying means having a low portion closely adjacent ground level where some clods and rocks tend to be picked up, and also having a rear upwardly inclined portion to the rear of said picking means having a raised rear end,
second mechanical conveyor means supported by said main frame in line with and to the rear of said first mechanical conveyor means with its forward end spaced, by a gap, below the rear end of said first mechanical conveyor means, said second mechanical conveyor means being rearwardly and upwardly inclined toward a rear end.
housing means supported by said main frame and covering said rear upwardly inclined portion of said first mechanical conveyor means and said second mechanical conveyor means and having narrow air inlets along said rear upwardly inclined portion, at the gap between said first and second mechanical conveyor means and at the rear end of said second mechanical conveyor means,
suction-inducing fan means supported by said main frame and having conduit means connecting it to said housing means and having outlet means, for pulling air in through said air inlets and through said conduit means and exhausting it through said outlet means, the air entering said inlet means meeting and causing turbulence, the suction flow carrying off leaves, stems, and other light trash while leaving the heavier and more dense pods, while said rocks and clods fall down through said gap,
a vertical air conduit to the rear of and in line with said second mechanical conveyor means and having a pod inlet into which said second mechanical con- veyor means dumps said pods, and having a dirt and rock outlet at its lower end, airflow impeller means for sending air into the lower end of said vertical air conduit to carry pods up therein, and a bin supported by said main frame for receiving said pods from said vertical air conduit.

2. The harvester of claim 1 having bin carriage means secured to said rear frame and extending upwardly and to one side thereof, said bin being slidably mounted for limited upward and sidewise movement in said carriage means, and pivotally mounted to one side thereof, and hydraulic means secured to said main frame and to said bin for moving said bin upwardly and sidewise along said carriage and then for tipping it around said pivot for dumping the contents thereof.

3. The harvester of claim 1 having a diversion conduit leading from the lower end of said vertical air conduit and terminating in a downwardly directed short and wide nozzle above said pod inlet, so that an airstream sweeps said pods from said belt into said pod inlet.

4. A harvester for pod type crops, comprising a self-propelled vehicle with front and rear wheels and a main frame, said main frame terminating closely adjacent the front of said front wheels and somewhat aft of said rear wheels, wheel guard means pivoted to the front end of said main frame so as to be retractable back of said front wheels, pod picking means secured to said main frame in between and to the rear of said front wheels, first mechanical conveyor means extending along the fore-and-aft center line of said vehicle and supported by said main frame adjacent said pod picking means for receiving picked pods, along with some leaves and stems and other light trash, said first mechanical conveying means having a low portion closely adjacent ground level where some clods and rocks tend to be picked up, and also having a rear upwardly inclined portion to the rear of said picking means having a raised rear end, second mechanical conveyor means supported by said main frame in line with and to the rear of said first mechanical conveyor means with its forward end spaced, by a gap, below the rear end of said first mechanical conveyor means, said second mechanical conveyor means being rearwardly and upwardly inclined to a rear end, housing means supported by said main frame and covering said rear inclined portion of said first mechanical conveyor means and said second mechanical conveyor means and having narrow air inlets at said rear inclined portion, at the gap between said first and second mechanical conveyor means and at the rear end of said second mechanical conveyor means, suction-inducing fan means supported by said main frame and having conduit means connecting it to said housing means and having outlet means, for pulling air in through said air inlets and through said conduit means and exhausting it through said outlet means, the air entering said inlet means meeting and causing turbulence, the suction flow carrying off leaves, stems, and other light trash while leaving the heavier and more dense pods, while said rocks and clods fall down through said gap, baffle means secured to said outlet means for directing the ejected trash rearwardly within the wake of said vehicle, a vertical air conduit to the rear of and in line with said second mechanical conveyor means and having a pod inlet into which said second mechanical conveyor means dumps said pods, and having a dirt and rock outlet at its lower end, airflow impeller means for sending air into the lower end of said vertical air conduit to carry pods up therein, an elbow outlet means pivotally mounted to said vertical air conduit, said elbow outlet means normally extending forwardly and being pivoted to the rear, means for tipping said elbow outlet means, bin carriage means secured to said rear frame and extending upwardly and to one side, a bin slidably mounted for limited upwardly and sidewise movement in said carriage means, and pivotally mounted to one side thereof, and hydraulic means secured to said main frame and to said bin for moving said bin upwardly and sidewise along said carriage and then for tipping it around said pivot for dumping the contents thereof.

5. The harvester of claim 4 wherein said dirt and rock outlet is provided with a normally closed pivoted counterweighted gate, opened when sufficient dirt and rocks accumulate thereon to dump them.

6. The harvester of claim 4 wherein a bypass conduit conducts air from said airflow impeller means to a flat, wide, downwardly directed nozzle positioned opposite and above said pod inlet and the rear end of said second mechanical conveyor means, so that an airstream sweeps the pods from said rear end into said pod inlet.

7. The harvester of claim 4 wherein there is an airstream dividing baffle positioned opposite the outlet from said elbow outlet means, said elbow outlet means sending the airstream out substantially horizontally, said baffle being tipped downwardly away from said outlet and having an upper curved portion for diverting the upper part of the horizontally flowing air and light entrained trash away from said bin, while the lower portion of said baffle spreads out the pods in said bin.

8. A harvester for pod type crops, comprising a self-propelled vehicle with front and rear wheels and a main frame, pod picking means secured to said main frame, first mechanical conveyor means extending along the fore-and-aft center line of said vehicle and supported by said main frame adjacent said pod picking means for receiving picked pods, along with some leaves and stems and other light trash, said first mechanical conveying means having a low portion closely adjacent ground level where some clods and rocks tend to be picked up, and also having a rear upwardly inclined portion to the rear of said picking means having a raised rear and, second mechanical conveyor means supported by said main frame in line with and to the rear of said first mechanical conveyor means with its forward end spaced, by a gap, below the rear end of said first mechanical conveyor means, said second mechanical conveyor means being rearwardly and upwardly inclined toward a rear end, housing means suppored by said main frame and covering said rear inclined portion of said first mechanical conveyor means and said second mechanical conveyor means and having narrow air inlets at said rear inclined portion, at the gap between said first and second mechanical conveyor means and at the rear end of said second mechanical conveyor means, and suction-inducing fan means supported by said main frame and having conduit means connecting it to said housing means and having outlet means, for pulling air in through said air inlets and through said conduit means and exhausting it through said outlet means, the air entering said inlet means meeting and causing turbulence, the suction flow carrying off leaves, stems, and other light trash while leaving the heavier and more dense pods, while said rocks and clods fall down through said gap.

9. The harvester of claim 8 having baffle means secured to said outlet means for directing the ejected trash rearwardly within the wake of said vehicle.

10. The harvester of claim 8 having a vertical air conduit to the rear of and in line with said second mechanical conveyor means and having a pod inlet into which said second mechanical conveyor means dumps said pods, having a pod outlet at an upper end having a dirt and rock outlet at its lower end, and airflow impeller means for sending air into the lower end of said vertical air conduit to carry pods up therein.

11. The harvester of claim 10 having flat, wide, downwardly directed nozzle means facing said pod inlet, for sending an airstream across the rear end of said second mechanical conveyor means and for sweeping said pods into said pod inlet.

12. A harvester for pod type crops, comprising
a self-propelled vehicle with front and rear wheels and a main frame, said main frame terminating closely adjacent the front of said front wheels and somewhat aft of said rear wheels,
wheel guard means pivoted to the front end of said main frame so as to be retractable back of said front wheels,
pod picking means secured to said main frame in between and to the rear of said front wheels,
conveyor means extending along the fore-and-aft center line of said vehicle and supported by said main frame adjacent said pod picking means for receiving picket pods,
bin carriage means secured to the rear of said frame and extending upwardly and to one side,
a bin for receiving pods from said conveyor means, slidably mounted for limited upward and sidewise movement in said carriage means, and pivotally mounted to one side thereof, and
hydraulic means secured to said main frame and to said bin for moving said bin upwardly and sidewise along said carriage and then for tipping it around said pivot for dumping the contents thereof, said conveyor comprising a mechanical conveyor means and a vertical air conduit to the rear of and in line with said mechanical conveyor means and having a pod inlet which said mechanical conveyor means dumps said pods, and having a dirt and rock oulet at its lower end,
airflow impeller means for sending air into the lower end of said vertical air conduit to carry pods up therein, and
outlet means emptying into said bin.

13. The harvester of claim 12 wherein said outlet means comprises an elbow pivotally mounted to said vertical air conduit, said elbow outlet means normally extending forwardly and being pivoted to the rear, and means for tipping said below outlet means rearwardly when said bin is to be dumped.

14. The harvester of claim 13 wherein said elbow exhausts its air entrained matter generally horizontally from an outlet opening and wherein a baffle is secured thereto and spaced therefrom, said baffle having an upper curved portion for diverting away the lightly laden upper portion of the horizontally exhausted airstream and a lower inclined portion for spreading the pods in said bin instead of permitting them to pile up conically in one place.

15. A cleaning device for crops adapted to be installed on a self-propelled harvester vehicle having pod picking means, comprising first mechanical conveyor means for receiving picked pods, along with some leaves and stems and other light trash, said first mechanical conveying means having a low portion closely adjacent ground level where some clods and rocks tend to be picked up, and also having a rear upwardly inclined portion to the rear of said picking means having a raised rear end,
second mechanical conveyor means in line with and to the rear of said first mechanical conveyor means with its forward end spaced, by a gap, below the rear end of said first mechanical conveyor means, said second mechanical conveyor means being rearwardly and upwardly inclined to a rear end,
housing means covering said rear inclined portion of said first mechanical conveyor means and said second mechanical conveyor means and having narrow air inlets at said rear inclined portion, at the gap between said first and second mechanical conveyor means and at the rear end of said second mechanical conveyor means,
Suction-inducing fan means having conduit means connecting it to said housing means and having outlet means, for pulling air in through said air inlets and through said conduit means and exhausting it through said outlet means, the air entering said inlet means meeting and causing turbulence, the suction flow carrying off leaves, stems, and other light trash while leaving the heavier and more dense pods, while said rocks and clods fall down through said gap.

16. The device of claim 15 having a vertical air conduit to the rear of and in line with said second mechanical conveyor means and having a pod inlet into which said second mechanical conveyor means dumps said pods, having a pod outlet and having a dirt and rock outlet at its lower end and airflow impeller means for sending air into the lower end of said vertical air conduit to carry pods up therein to said outlet.

17. The harvester of claim 16 having flat, wide, downwardly directed nozzle means facing said pod inlet, for sending an airstream across the rear end of said second mechanical conveyor means and for sweeping said pods into said pod inlet.

18. A harvester for pod type crops, comprising
a self-propelled vehicle with front and rear wheels and a main frame,
pod picking means secured to said main frame in between and to the rear of said front wheels,
mechanical conveyor means extending along the fore-and-aft center line of said vehicle and supported by said main frame adjacent said pod picking means for receiving picked pods, said mechanical conveying means having a low portion and a rear upwardly inclined portion having a raised rear end,
a vertical air conduit to the rear of and in line with said mechanical conveyor means and having a pod inlet opposite said rear end,
airflow impeller means for sending air into the lower end of said vertical air conduit to carry pods up therein to an outlet,
nozzle means having a wide and short and downwardly directed outlet positioned adajcent said pod inlet, and
conduit means for conducting air from said airflow impeller means to said nozzle means for sweeping said pods from said mechanical conveyor means into said pod inlet.

References Cited by the Examiner
UNITED STATES PATENTS

| | | | |
|---|---|---|---|
| Re. 25,044 | 10/1961 | Ward | 56—130 |
| 3,083,058 | 3/1963 | Walstrom et al. | 298—13 X |
| 3,214,894 | 11/1965 | Whitman | 56—119 |

ANTONIO F. GUIDA, *Acting Primary Examiner.*

ABRAHAM G. STONE, *Examiner.*

P. A. RAZZANO, *Assistant Examiner.*

UNITED STATES PATENT OFFICE
CERTIFICATE OF CORRECTION

Patent No 3,306,018                                  February 28, 1967

Ray Whitman

It is hereby certified that error appears in the above numbered patent requiring correction and that the said Letters Patent should read as corrected below.

Column 8, line 48, for "and" read -- end --; column 9, line 5, for "upper end" read -- upper end, and --; line 26, for "picket" read -- picked --; line 41, after "inlet" insert -- into --; line 52, for "below" read -- elbow --; line 55, after "air" insert -- and --; column 10, line 14, for "Suction" read -- suction --.

Signed and sealed this 26th day of September 1967.

(SEAL)
Attest:

ERNEST W. SWIDER
Attesting Officer

EDWARD J. BRENNER
Commissioner of Patents